United States Patent
Li

(10) Patent No.: US 8,830,392 B2
(45) Date of Patent: Sep. 9, 2014

(54) SPLICE DISPLAY

(71) Applicant: Shenzhen China Star Optoelectronics Technology Co., Ltd, Shenzhen (CN)

(72) Inventor: Chunhuai Li, Shenzhen (CN)

( * ) Notice: Subject to any disclaimer, the term of this patent is extended or adjusted under 35 U.S.C. 154(b) by 0 days.

(21) Appl. No.: 13/824,336

(22) PCT Filed: Jan. 17, 2013

(86) PCT No.: PCT/CN2013/070594
§ 371 (c)(1),
(2), (4) Date: Mar. 15, 2013

(87) PCT Pub. No.: WO2014/110753
PCT Pub. Date: Jul. 24, 2014

(65) Prior Publication Data
US 2014/0198251 A1 Jul. 17, 2014

(30) Foreign Application Priority Data

Jan. 16, 2013 (CN) .......................... 2013 1 0015347

(51) Int. Cl.
| | |
|---|---|
| H04N 5/66 | (2006.01) |
| H04N 9/12 | (2006.01) |
| H04N 9/67 | (2006.01) |
| H04N 3/14 | (2006.01) |
| H04N 5/70 | (2006.01) |
| G09G 5/00 | (2006.01) |
| G09G 5/02 | (2006.01) |
| H04N 11/20 | (2006.01) |

(52) U.S. Cl.
CPC .................................... *H04N 11/20* (2013.01)
USPC ........... 348/383; 348/659; 348/790; 348/800; 345/1.36; 345/604

(58) Field of Classification Search
CPC ........... H04N 3/127; H04N 5/57; H04N 9/73; H04N 9/3147; H04N 13/0425; H01L 2251/5323; G03B 37/04; G09G 2320/0693; G09G 2300/26; G09G 2310/0232; G02B 27/066; G02F 1/33308; G02F 1/33608; G02F 1/3336; G06F 3/1423; G06F 3/1446
USPC ........... 348/790, 800, 383, 659; 345/1.1, 1.3, 345/3.1, 604; 349/58
See application file for complete search history.

(56) References Cited

U.S. PATENT DOCUMENTS 6,570,623 B1 * 5/2003 Li et al. .......................... 348/383
6,717,625 B1 * 4/2004 Thielemans .................. 348/745

(Continued)

FOREIGN PATENT DOCUMENTS

| CN | 201374154 Y | 12/2009 |
|---|---|---|
| CN | 101794565 A | 8/2010 |

(Continued)

OTHER PUBLICATIONS

Jiang Yingting, the International Searching Authority written comments, Oct. 2013, CN.

*Primary Examiner* — Brian Yenke

(57) ABSTRACT

A splice display includes at least two liquid crystal displays (LCDs) that are mutually spliced, and the LCDs form a spliced frame at a spliced position of the LCD. The splice display further includes an image splitter and at least one organic electroluminescence display (OLED) panel. A frame of the OLED is transparent, and the OLED covers the spliced frame. The image splitter splits an image signal into a plurality of parts, and transmits the split image signal to the OLED and the LCDs for display.

5 Claims, 4 Drawing Sheets

(56) References Cited

U.S. PATENT DOCUMENTS

| | | | |
|---|---|---|---|
| 7,940,329 B2 * | 5/2011 | Houmeau et al. | 348/383 |
| 2008/0284793 A1 | 11/2008 | Young | |
| 2009/0289874 A1 * | 11/2009 | Ha | 345/1.3 |
| 2011/0050545 A1 * | 3/2011 | Namm et al. | 345/5 |
| 2012/0001830 A1 * | 1/2012 | Xia et al. | 345/1.2 |
| 2012/0098739 A1 * | 4/2012 | Hsieh et al. | 345/107 |
| 2012/0268684 A1 * | 10/2012 | Li | 349/58 |
| 2013/0010013 A1 * | 1/2013 | Li et al. | 345/690 |

FOREIGN PATENT DOCUMENTS

| | | |
|---|---|---|
| CN | 101692335 A | 4/2012 |
| CN | 202285170 U | 6/2012 |
| CN | 202584678 U | 12/2012 |
| CN | 202615763 U | 12/2012 |
| CN | 102870152 A | 1/2013 |
| JP | 2012173669 A | 9/2012 |

* cited by examiner

SPLICE DISPLAY

TECHNICAL FIELD

The present disclosure relates to the field of the display, and more particularly to a splice display.

BACKGROUND

A typical large-area splice display is generally spliced into a plurality of small-area displays. An image signal displayed is split into several parts by an image splitter, and then correspondently transmitted to the small-area displays to display. When viewers want to watch a high quality display image at a short range, a plurality of small-area liquid crystal displays (LCDs) are spliced. Because the LCDs in a prior art inevitably have wide or narrow frames, all the large-area splice displays spliced by the LCDs have spliced frames. Because the spliced frames are unable to display an image, this affects image quality and reduces viewer's comfort level. Widths of the spliced frames are reduced as far as possible; however, it is not possible to fully remove the spliced frames.

SUMMARY in view of the above-described problems, an aim of the present disclosure is to provide a splice display without a spliced frame.

A first technical scheme of the present disclosure is that: a splice display comprises at least two liquid crystal displays (LCDs) that are mutually spliced.

The LCDs form a spliced frame at a spliced position of the LCD. The splice display further comprises an image splitter and at least one organic electroluminescence display (OLED). A frame of the OLED is transparent, the OLED covers the spliced frame, and the image splitter splits an image signal into a plurality of parts and then transmits the split image signal to the LCDs and the OLED for display.

The splice display further comprises a color calibrater that calibrates the image signal of the OLED to enable a color saturation of the LCDs and a color saturation of the OLED to be consistent.

The color calibrater comprises a display parameter format conversion module, and a hue and saturation adjusting module. The hue and saturation adjusting module comprises a preset lookup table. The display parameter format conversion module converts a display parameter of RGB format in the image signal into a YCbCr parameter. The hue and saturation adjusting module looks he YCbCr parameter up in the lookup table and rewrites the YCbCr parameter into a new YCbCr parameter, and the display parameter format conversion module converts the new YCbCr parameter into a new display parameter of the RGB format and then transmits the new display parameter of the RGB format to the OLED for display.

The splice display further comprises a brightness calibrater that increases brightness of a covered zone of the LCD covered by the frame of the OLED to enable brightness of all zones of the splice display to be uniform.

The OLED is attached to the spliced frame by an adhesive.

A second technical scheme of the present disclosure is that: a splice display comprises at least two LCDs that are mutually spliced. The LCDs form a spliced frame at a spliced position of the LCD. The splice display further comprises an image splitter and at least one OLED. A frame of the OLED is transparent, the OLED covers the spliced frame, and the image splitter splits an image signal into a plurality of parts and transmits the split image signal to the LCDs and the OLED for display.

In one example, the splice display further comprises a color calibrater that calibrates the image signal of the OLED to enable a color saturation of the LCDs and a color saturation of the OLED to be consistent.

In one example, the color calibrator comprises a display parameter format conversion module, and a hue and saturation adjusting module. The hue and saturation adjusting module comprises a preset lookup table. The display parameter format conversion module converts a display parameter of RGB format in the image signal into a YCbCr parameter. The hue and saturation adjusting module looks the YCbCr parameter up in the lookup table and rewrites the YCbCr parameter into a new YCbCr parameter, and the display parameter format conversion module converts the new YCbCr parameter into a new display parameter of the RGB format and then transmits the new display parameter of the RGB format to the OLED for display.

In one example, the splice display further comprises a brightness calibrater increases brightness of a covered zone of the LCD covered by the frame of the OLED to enable the brightness of all zones of the SLED to be uniform.

In one example, the OLED is in a strip shape or cross shape.

In one example, the OLED is attached to the spliced frame by an adhesive.

A third technical scheme of the present disclosure is that: a display method of the above splice display comprises: using an image splitter to split the image signal into a plurality of pans, and transmitting the split image signal to the LCDs and the OLED for display.

In one example, the image signal transmitted to the OLED is calibrator by the color calibrater to enable a color saturation of the LCD panel and a color saturation of the OLED panel to be consistent.

In one example, the color calibrater uses the display parameter format conversion module to convert a display parameter of RGB format into a YCbCr parameter, uses the hue and saturation adjusting module to look the YCbCr parameter up in the lookup table and rewrite the YCbCr parameter into a new YCbCr parameter, and uses the display parameter format conversion module to convert the new YCbCr parameter into a new display parameter of the RGB format and transmit the new display parameter of RGB format to the OLED for display.

In one example, the color calibrater increases brightness of a covered zone of the LCD covered by the frame of the OLED to enable the brightness of all zones of the splice display to be consistent.

Advantages of the present disclosure are summarized below: the splice display of the present disclosure comprises at least two LCDs that are mutually spliced and at least one OLED. The LCDs form the spliced frame at a spliced position of the LCD, and the OLED covers the spliced frame. The OLED may display delicate image as the LCDs. The image splitter splits the image signal into a plurality of parts, and transmits the split image signal to the OLED and the LCDs to display and form a complete image. The present disclosure fully uses that the frame of the OLED may be transparent. Because the transparent frame may not affect the display of the LCD, the spliced frame is completely removed from the total splice display. In addition, the OLED may not obviously affect the visual sense of people basically when the OLED 2 attaches on the upper part of the LCDs because the OLED is thin. Technical limitations still exist for manufacturing large-area OLEDs in the prior art. A width of the OLED used in the present disclosure is only required to be the same as or slightly wider than a width of the spliced frame, which makes the OLED have a small total area and easy to manufacture.

DETAILED DESCRIPTION

The present disclosure provides a splice display. FIG. 1 to FIG. 6 shows a first example of the splice display of the present disclosure. The splice display includes two liquid crystal displays (LCDs) 1 that are mutually spliced. The LCDs 1 form a spliced frame 3 at a spliced position of the LCD 1. The splice display further includes an image splitter and at least one organic electroluminescence display (OLED) 2. A frame 21 of the OLED 2 is transparent, and the OLED 2 covers the spliced frame 3. The image splitter splits an image signal into a plurality of parts, and transmits the split image signal to the OLED 2 and the LCDs 1 for display. In the example, the OLED 2 is in a strip shape.

The splice display of the example includes at least two LCDs 1 that are mutually spliced and at least one OLED 2. The LCDs 1 form the spliced frame 3 at a spliced position of the LCDs 1. Since the OLED 2 covers the spliced frame 3, the OLED 2 may display a high quality image on the LCDs 1. The image splitter splits an image signal into a plurality of parts, and transmits the split image signal to the OLED 2 and the LCDs 1 to display and form a complete image. The present disclosure fully uses an advantage that the frame 21 of the OLED 2 may be transparent. Because the transparent frame 21 may not affect display of the LCDs 1, the spliced frame 3 is completely removed from the splice, display. In addition, the OLED 2 may not obviously affect a viewer's visual sense when the OLED 2 attaches onto the spliced frame by an adhesive because the OLED 2 is very thin. Technical limitations still exist for manufacturing large-area OLEDs in the prior art. A width of the OLED 2 used in the present disclosure is only required to be the same as or slightly wider than a width of the spliced frame 3, which makes the OLED 2 have a small total area and easy to manufacture.

Figure 1:
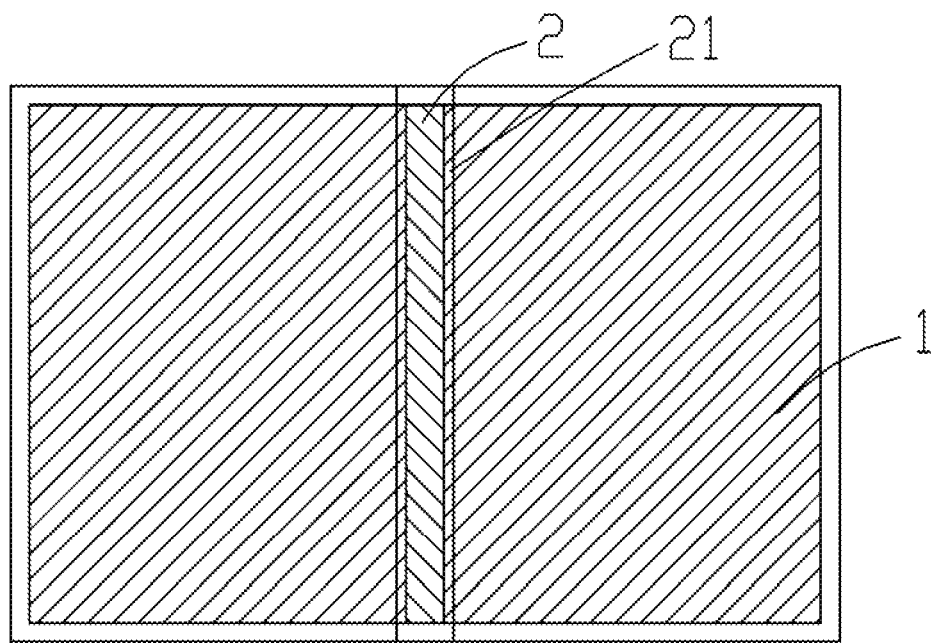
FIG. 1 is a front view of a first example of a splice display of the present disclosure.
Figure 2:
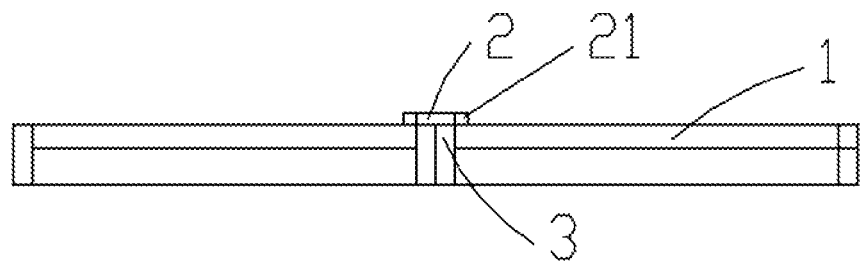
FIG. 2 is a side view of the first example of the splice display of the present disclosure.
Figure 3:
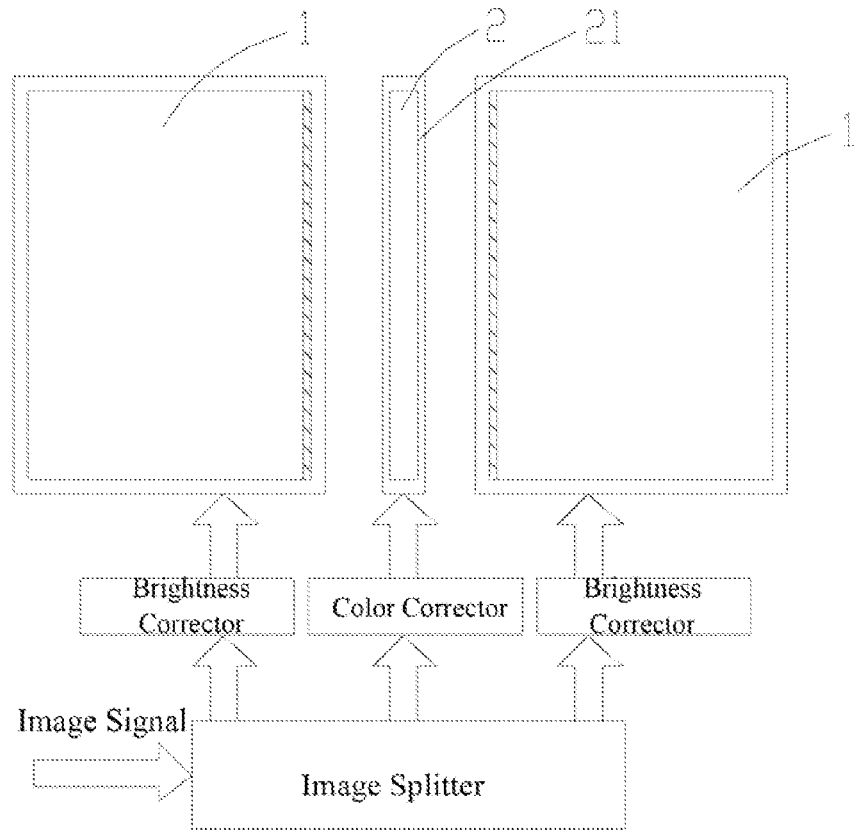
FIG. 3 is a schematic diagram of the first example of the splice display of the present disclosure.
Figure 4:
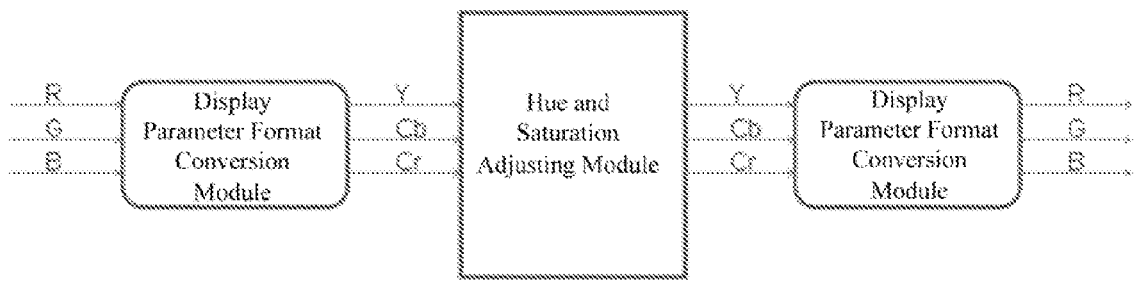
FIG. 4 is a schematic diagram of an example of a color calibrater of the present disclosure.

Generally speaking, a color saturation of the OLED 2 is greater than a color saturation of the LCDs 1. If difference between the color saturation of the OLED 2 and color saturation of the LCDs 1 is overlarge, viewer's comfort level may be affected. In order to solve the problem, as shown in FIG. 3, the splice display of the example further includes a color calibrater. The color calibrater is used to calibrate the image signal of the OLED 2 to enable the color saturation of the LCDs 1 and the color saturation of the OLED 2 to be consistent, which improves viewer's comfort level. FIG. 4 shows a specific example of the color calibrater, the color calibrater includes a display parameter format conversion module, and a hue and saturation adjusting module. The hue and saturation adjusting module includes a preset lookup table. The display parameter format conversion module converts a display parameter of RGB format in the image signal into a YCbCr parameter. The hue and saturation adjusting module looks the YCbCr parameter up in the lookup table and rewrites the YCbCr parameter into a new YCbCr parameter, and the display parameter format conversion module converts the new YCbCr parameter into a new display parameter of the RGB format and transmits the new display parameter of the RGB format to the OLED 2 for display.

Figure 5:
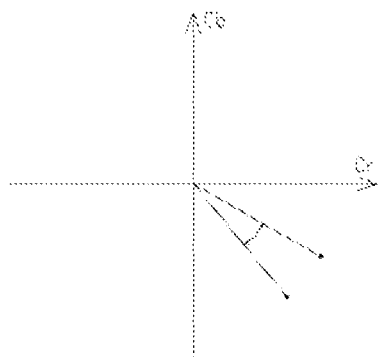
FIG. 5 is a schematic diagram of a hue and saturation adjusting module adjusting the hue of the present disclosure.
Figure 6:
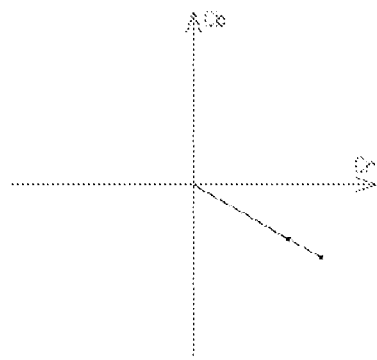
FIG. 6 is a schematic diagram of the hue and saturation adjusting module adjusting saturation of the present disclosure.

The preset lookup table is obtained by experiment tests that the LCDs 1 and the OLED 2 are optically detected, and is recorded in the hue and saturation adjusting module in advance. In the YCbCr display parameter, Y represents brightness, and CbCr represents hue and saturation. At this moment, we only need to look up the preset lookup table and adjust the hue and saturation represented by CbCr without adjusting the brightness, which makes display of the splice display uniform basically. Moreover, the hue and saturation can be more visually and easily modified in a coordinate system of the YCbCr display parameter, which makes the experiment test and commissioning be easily. As shown in FIG. 5 and FIG. 6, the hue is adjusted by adjusting an angle of a color vector, and the saturation is adjusted by adjusting a length of a color vector.

If the frame 21 of the OLED 2 is narrowed as far as possible, more cost may be increased. Because the frame 21 of the OLED 2 may be transparent, the transparent frame 21 may still cover a back of the LCD, and still reduce brightness of a covered zone of the LCD 1 covered by the frame 21 of the OLED 2 although the display of the LCD 2 may not be affected. Thus, the splice display of the example further includes a brightness calibrater that increases brightness of the covered zone to enable the brightness of all zones of the splice display to be uniform.

A display method of a splice display of the example includes: using an image splitter to split an image signal into a plurality of parts, transmitting the split image signal to the LCDs 1 and the OLED 2 for display, and using a color calibrater to calibrate the image signal of the OLED 2 to enable the color saturation of the LCDs 1 and the color saturation of the OLED 2 to be consistent, using the color calibrater to increase the brightness of the covered zone of the LCD 1 covered by the frame 21 of the OLED 2 to enable brightness of all zones of the splice display to be uniform.

Figure 7:
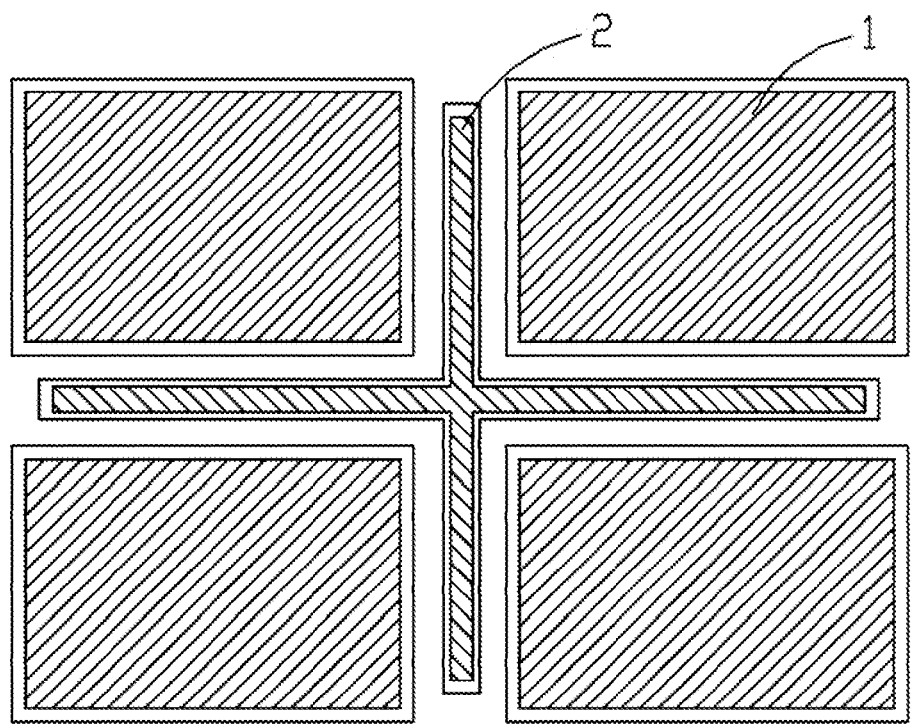
FIG. 7 is a disassembly diagram of a second example of the splice display of the present disclosure.

FIG. 7 shows a second example of the splice display of the present disclosure, and the second example is different from the first example in that: the splice display includes four LCDs 1, and the four LCD form a cross spliced frame. The OLED 2 in the example is in a cross shape and covers the spliced frame. The image splitter splits the image signal into five parts, and transmits the split image signal to the LCDs 1 and the OLED 2 for display.

Figure 8:
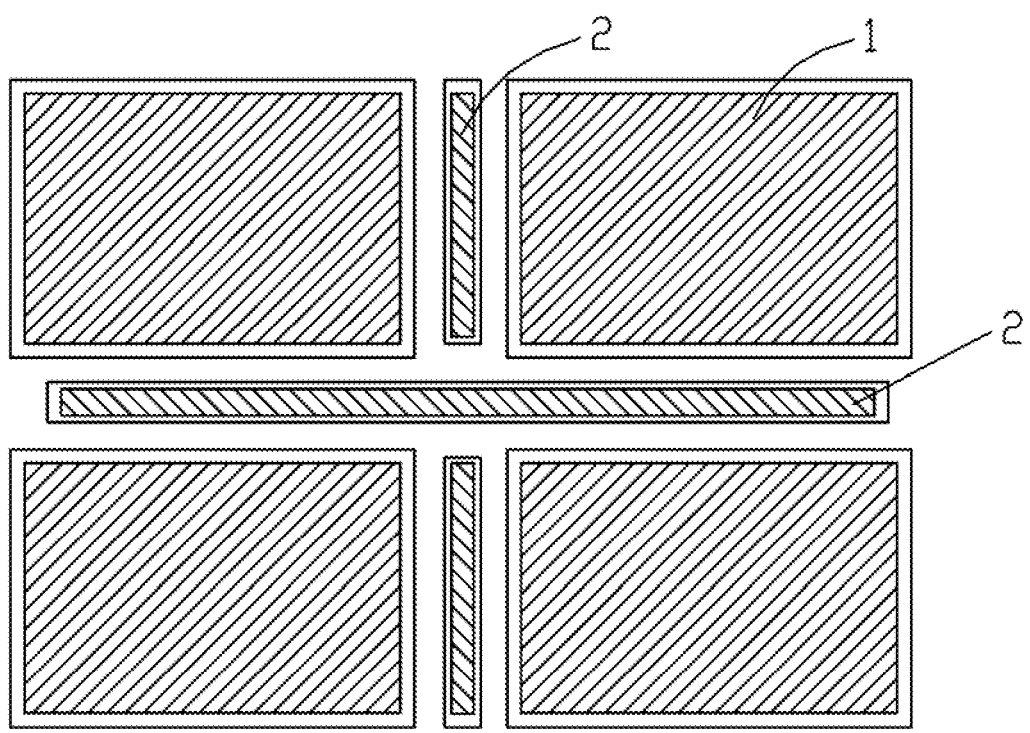
FIG. 8 is a disassembly diagram of a third example of the splice display of the present disclosure.

FIG. 8 shows a third example of the splice display of the present disclosure, and the third example is different from the second example in that: the splice display includes three OLEDs in the example, and the three OLEDs 2 are spliced into a cross shape to cover the spliced frame 3. The image splitter splits the image signal into seven parts, and transmits the split image signal to the LCDs 1 and the OLED 2 for display. The OLED 2 in the example is in a strip shape, which makes structure simple and have a low cost.

The present disclosure is described in detail in accordance with the above contents with the specific preferred examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

The invention claimed is:

1. A splice display, comprising:
   at least two liquid crystal displays (LCDs) that are mutually spliced; wherein the LCDs form a spliced frames at a spliced position of the LCDs, and a frame of the OLED is transparent; the OLED covering the spliced frame;
   at least one organic electroluminescence display (OLED) attached to the spliced frame by an adhesive
   an image splitter that splits an image signal into a plurality of parts and transmits the split image signals to the OLED and the LCDs for display;
   a color calibrater that calibrates the image signal of the OLED to enable a color saturation of the LCDs and a color saturation of the OLED to be consistent, wherein the color calibrater comprises a display parameter format conversion module, and a hue and saturation adjusting module; the hue and saturation adjusting module comprises a preset lookup table, the display parameter format conversion module converts a display parameter of RGB format in the image signal into a YCbCr parameter, the hue and saturation adjusting module looks the YCbCr parameter up in the lookup table and rewrites the YCbCr parameter into a new YCbCr parameter, the display parameter format conversion module converts the new YCbCr parameter into a new display parameter of the RGB format and transmits the new display parameter of RGB format to the OLED for display; and
   a brightness calibrater that increases brightness of a covered zone of the LCD covered by the frame of the OLED to enable the brightness of all zones of the splice display to be uniform.

2. A splice display, comprising:
   at least two liquid crystal displays (LCDs) that are mutually spliced,
   an image splitter; and
   at least one organic electroluminescence display (OLED);
   wherein the LCDs form a spliced frame at a spliced position of the LCD; a frame of the OLED is transparent, the OLED covers the spliced frame, and the image splitter splits an image signal into a plurality of parts, and transmits the split image signals to the OLED and the LCDs for display;
   wherein the splice display further comprises a color calibrater that calibrates the image signal of the OLED to enable a color saturation of the LCDs and a color saturation of the OLED to be consistent; and
   wherein the color calibrater comprises a display parameter format conversion module, and a hue and saturation adjusting module; the hue and saturation adjusting module comprises a preset lookup table, the display parameter format conversion module converts a display parameter of RGB format in the image signal into a YCbCr parameter, the hue and saturation adjusting module looks the YCbCr parameter up in the lookup table and rewrites the YCbCr parameter into a new YCbCr parameter, and the display parameter format conversion module converts the new YCbCr parameter into a new display parameter of the RGB format and transmits the new display parameter of the RGB format to the OLED for display.

3. The splice display of claim 2, wherein the splice display panel further comprises a brightness calibrater; the brightness calibrater increases brightness of a covered zone of the LCD covered by the frame of the OLED to enable the brightness of all zones of the splice display to be uniform.

4. The splice display of claim 2, wherein the OLED is in a strip shape or cross shape.

5. The splice display of claim 2, wherein the OLED is attached to the frame by an adhesive.

* * * * *